L. C. MALTBY & F. CASEY.
CUT-OFF FOR STRAW MAKING MACHINES.
APPLICATION FILED FEB. 12, 1916.
1,205,913.
Patented Nov. 21, 1916.
2 SHEETS—SHEET 1.
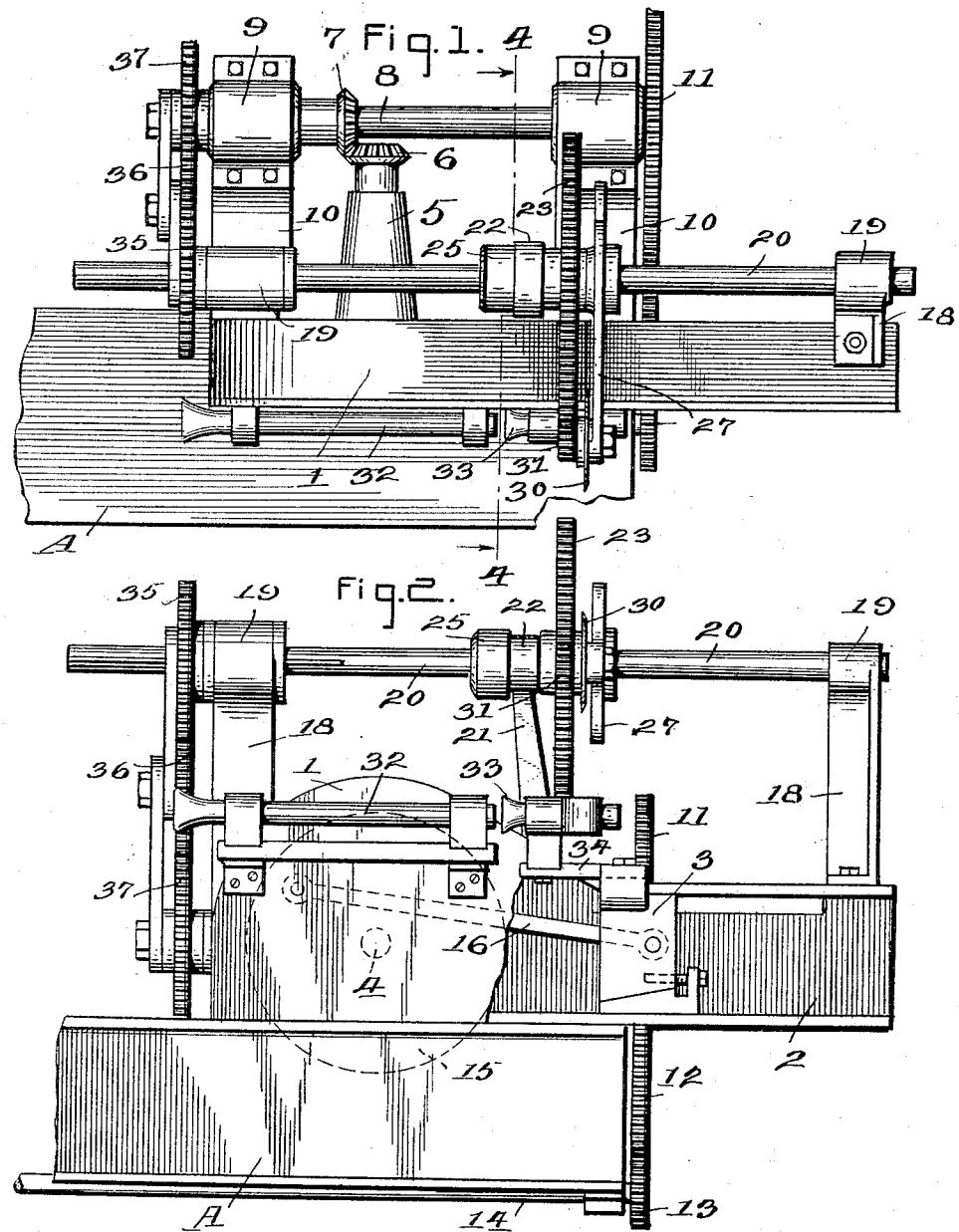

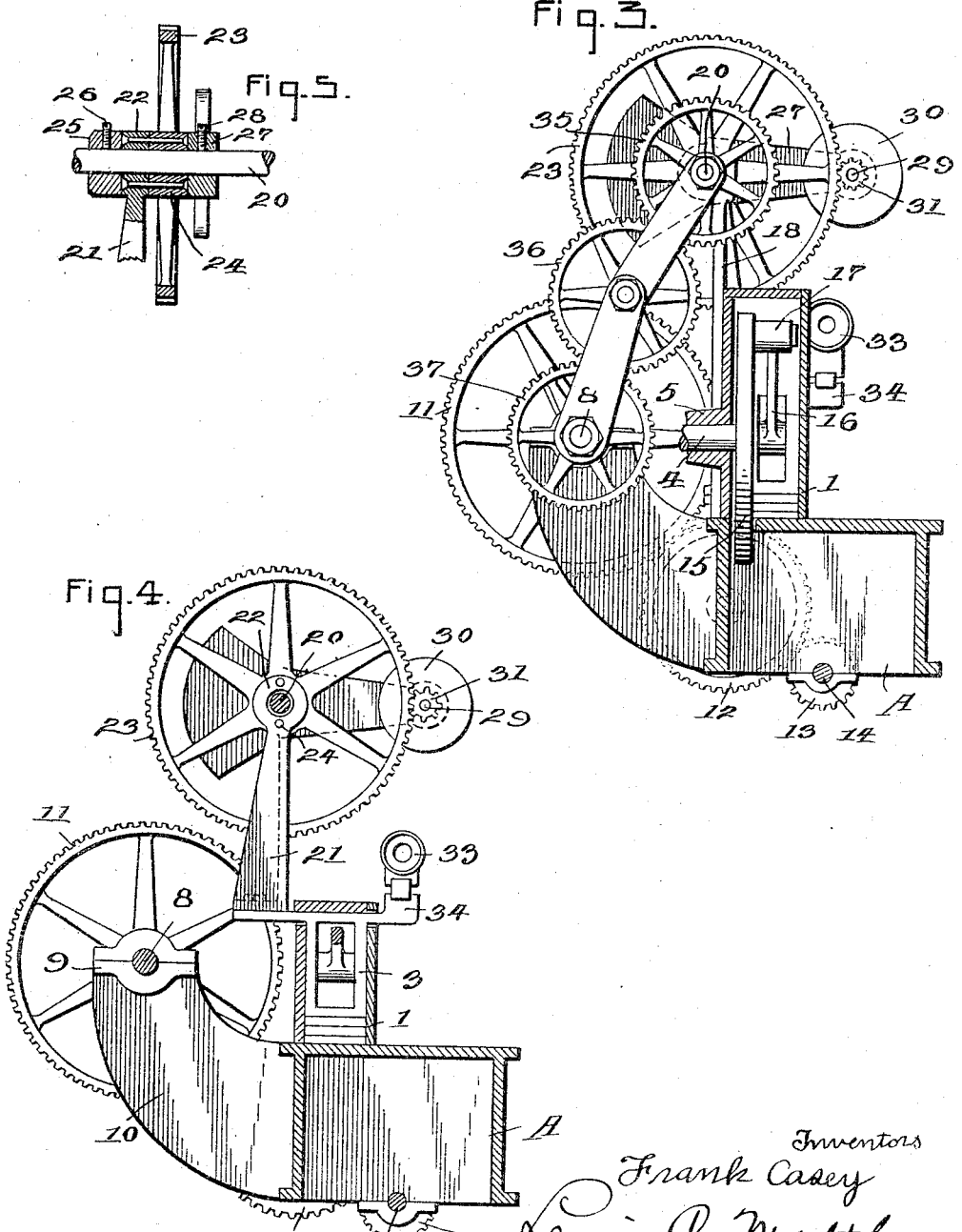

UNITED STATES PATENT OFFICE.

LEWIS C. MALTBY AND FRANK CASEY, OF WASHINGTON, DISTRICT OF COLUMBIA, ASSIGNORS TO THE STONE STRAW COMPANY, OF WASHINGTON, DISTRICT OF COLUMBIA, A CORPORATION OF NEW JERSEY.

CUT-OFF FOR STRAW-MAKING MACHINES.

1,205,913. Specification of Letters Patent. Patented Nov. 21, 1916.

Application filed February 12, 1916. Serial No. 78,059.

*To all whom it may concern:*

Be it known that we, LEWIS C. MALTBY and FRANK CASEY, citizens of the United States, residing at Washington, in the District of Columbia, have invented certain new and useful Improvements in Cut-Offs for Straw-Making Machines, of which the following is a specification.

Our invention relates to an improved cut-off for straw making machines, and it involves the principle of a balanced planetary disk cutter, which is secured to a shaft, which has a pinion adapted to travel around a reciprocating but non-rotating gear, so that the disk cutter not only rotates at a rapid rate but also revolves in an orbital path, whereby rotary motion is imparted to it, and it passes during its transit rapidly in and out of the path of the straw to be cut.

Our invention involves this and other features which will be more fully described hereinafter and recited in the claims.

In the accompanying drawings: Figure 1 is a plan view; Fig. 2 is a view in side elevation; Fig. 3 is a section on the line 3—3 of Fig. 1; Fig. 4 is a section on the line 4—4 of Fig. 1; and Fig. 5 is a fragmentary sectional view through the stationary but slidable gear.

A, is the bed or frame of the machine cast in any suitable size and form and mounted on legs (not shown). A housing 1 is secured on the bed, and its forward end terminates in a cross-head or plunger-guide 2 within which the cross-head or plunger 3 reciprocates. A cross-shaft 4 is journaled in a bearing 5, and has a bevel-gear 6 on one end. This is engaged by a bevel-gear 7 on the countershaft 8, and the countershaft 8 is supported in bearings 9 on the arms 10. This countershaft is provided with a large gear 11, the teeth of which mesh with an intermediate idle-gear 12, and which latter meshes with the teeth of pinion 13 keyed on the main drive-shaft 14. On the opposite end of the cross-shaft 4, the crank-disk 15 is secured, and a connecting-rod 16 extends from the wrist pin 17 on this crank disk to the cross-head or plunger 3.

Extending upwardly from the bed A and the housing 1 are the arms 18, which latter have collars 19, 19, in their upper ends, in which the shaft 20 is slidably mounted. An arm 21 extends upwardly from the plunger or cross-head 3, (as shown in Figs. 4 and 5), and through a collar 22 on the upper end of this arm 21 the shaft 20 turns, and to the collar 22 the large gear 23 is secured by rivets 24. A collar 25 is secured to the shaft 20 on one side of the collar 22 on the upper end of the arm 21, by a set-screw 26, (as shown in Fig. 5). Also secured on the shaft 20 on the opposite side of the hub of the gear-wheel 23 is a counterweighted arm 27, by means of a set-screw 28, so that it turns with the rotation of the shaft. This counterweighted arm 27 has an axle 29 secured to its outer end, upon which the disk cutter 30 is mounted to turn. To this axle the small gear 31 is secured, the teeth of which mesh with the teeth of wheel 23 around which the axle-gear and disk cutter rotate with the rotation of the reciprocating rotary shaft 21, which shaft with the arm 21 moves with the cross-head or plunger 3, in order that the disk cutter 30 may travel with the straw and cross the path of the latter with each complete circuit of the disk cutter around the toothed gear 23. The straw is guided through the stationary straw-guide 32 secured to the side of the housing 1 (see Fig. 1 and 2) and the movable straw-guide 33 which is carried on an arm 34 secured to the plunger or cross-head 3 (as shown in Figs. 2, 3, and 4).

The shaft 20 is driven by means of a gear-wheel 35, which meshes with an intermediate gear-wheel 36, and which latter meshes with a gear-wheel 37 on the countershaft 8.

We claim:

1. The combination of a reciprocating cross-head which carries a straw-guide and an arm, a slidably mounted shaft rotatable in and reciprocated by said arm, an arm fixed to said shaft and carrying a rotary disk-cutter, means for causing the disk-cutter to revolve due to the rotation of the arm with the rotary reciprocating shaft, and gears for transmitting motion from one moving part to another, the slidably mounted shaft having slidable keyed connection with one of said gears.

2. The combination of a machine-bed or frame, and a cross-head or plunger which carries two arms, a straw guide section carried by one arm, a shaft rotatably mounted in the other arm, and movable therewith, a gear-wheel secured to said arm, an arm secured to the shaft, an axle rotatably supported in the arm and having a disk cutter, a gear-wheel secured thereto, the teeth of the latter gear-wheel meshing with the teeth of the gear-wheel carried by the arm secured on the cross-head or plunger, and means for rotating said shaft and for reciprocating the plunger, whereby the disk cutter, plunger, and straw guide section move together with the forward movement of the straw, and the cutter disk crosses the path of the straw, whereby to sever the latter with each cycle of movement around the gear carried by the arm from the plunger or cross-head.

3. The combination of a machine-bed or frame, arms secured thereto, a reciprocating cross-head or plunger, a shaft slidably and rotatably supported by said arms, an arm extending from the cross-head, and having a collar at its upper end, a large gear-wheel secured to said collar and through which collar and the hub of which gear-wheel said shaft passes, an arm secured to the shaft, and carrying an axle, a disk cutter and gear secured to said axle, the teeth of the gear meshing with the teeth of the large gear, and which cause the disk cutter to rotate with the travel of the latter around the large gear in the rotation of the shaft, and a straw-guide carried by the cross-head.

4. The combination of a machine bed or frame, a housing thereon terminating in a plunger or cross-head guide, a plunger or cross-head slidably mounted therein, means for reciprocating said plunger, an arm erected on the plunger on each side of the housing, one carrying a straw-guide, and a large gear-wheel secured to the other, a shaft slidably and rotatably supported by the machine and passing through said arm on the cross-head and the large gear wheel, an arm carried by said shaft, an axle rotatably supported on said arm and carrying a disk cutter and gear, the teeth of which latter mesh with the teeth of the large gear-wheel, a main shaft, a countershaft driven thereby, a cross-shaft, bevel pinions on the counter- and cross-shafts for transmitting motion from one to the other, a crank-disk secured on the cross-shaft, and a connecting-rod extending therefrom to the plunger or cross-head, and gears for transmitting motion from the countershaft to the shaft which carries the disk cutter.

In testimony whereof we affix our signatures.

LEWIS C. MALTBY.
FRANK CASEY.